United States Patent [19]
Nishiyama et al.

[11] Patent Number: 5,715,110
[45] Date of Patent: Feb. 3, 1998

[54] MAGNETIC RECORDING AND REPRODUCING APPARATUS WITH THERMAL ASPERITY CORRECTION

[75] Inventors: Nobumasa Nishiyama; Toshiaki Tsuyoshi, both of Odawara, Japan

[73] Assignee: Hitachi, Ltd., Tokyo, Japan

[21] Appl. No.: 286,860

[22] Filed: Aug. 5, 1994

[30] Foreign Application Priority Data

Aug. 9, 1993 [JP] Japan .................. 5-197100

[51] Int. Cl.$^6$ .................. G11B 5/02; G11B 5/09
[52] U.S. Cl. .................. 360/67; 360/46
[58] Field of Search .................. 360/46, 53, 65, 360/67

[56] References Cited

U.S. PATENT DOCUMENTS

| | | | |
|---|---|---|---|
| 4,774,601 | 9/1988 | Ouchi et al. .................. | 360/46 |
| 4,914,398 | 4/1990 | Jove et al. .................. | 3287/167 |
| 5,233,482 | 8/1993 | Galbraith et al. .................. | 360/46 |
| 5,353,176 | 10/1994 | Kosuge .................. | 360/53 X |

OTHER PUBLICATIONS

IEEE Trans. Magn., vol. 27, No. 6, Nov. 1991, pp. 4503–4508 Magnetic Recording Channel Front–Ends, Klaassen, K. B.

IEEE, Trans. Magn., vol. 28, No. 5, Sep. 1992, pp. 2731–2732 Gailbraith, R. L., Kerwin C. S., Poss, J. M. Magneto–Resistive Head Thermal Asperity Digital Compensation.

IEEE, Trans. Magn., vol. 28, No. 5, Sep. 1992, pp. 2548–2550 Thin Film Thermocouple Sensors for Measurement of Contact Temp. Schreck, E., Fontana, E., Singh, G. P.

Primary Examiner—Aristotelis M. Psitos
Assistant Examiner—Regina Y. Neal
Attorney, Agent, or Firm—Kenyon & Kenyon

[57] ABSTRACT

In a magnetic disk apparatus of high-speed data transfer, in order to cover an uncompensable section of the thermal asperity by error code correction to shorten the uncompensable section, upper and lower envelopes of a reproduced waveform are detected to obtain a level variation waveform due to the thermal asperity and subtract it from the reproduced signal. A thermal asperity processing circuit shown in FIG. 1 for compensating for the thermal asperity is used. In an envelope detection circuit in the thermal asperity processing circuit, a forced charge and discharge current control circuit is used in the thermal asperity portion to thereby be able to improve the follow-up characteristic to level variation of the thermal asperity and shorten the uncompensable section.

6 Claims, 14 Drawing Sheets

WAVEFORM ⓐ

WAVEFORM ⓑ

WAVEFORM c

WAVEFORM d: ENVELOPE OUTPUT CORRESPONDING TO WAVEFORM b

OCCURRENCE SECTION OF THERMAL ASPERITY

MAGNETIC RECORDING AND REPRODUCING APPARATUS WITH THERMAL ASPERITY CORRECTION

BACKGROUND OF THE INVENTION

The present invention relates to an apparatus for compensating for fluctuation (hereinafter referred to as thermal asperity) of a reproduced waveform produced when a reproducing head comes into contact with a recording medium upon reproduction in a magnetic recording apparatus which reproduces information from the recording medium in which the information is recorded in the form of magnetization transition by means of the recording head utilizing the magneto-resistive effect.

A magnetic recording and reproducing system which reproduces information by means of a magneto-resistive reproducing head (hereinafter referred to as an MR head) from a recording medium in which the information is recorded in the form of magnetization transition is being employed.

The operation principle of the MR head utilizes the phenomenon that when a magnetic field is applied to an MR element the direction of magnetization of the MR element is changed and an electric resistance thereof is varied in proportion to an angle between the direction of the magnetization and a direction of a sense current flowing into the MR element. When the reproduction is made by means of the MR head, the variation of the electric resistance is taken out from the sense current as a variation of a voltage or current. Information is reproduced from the taken-out signal by means of the signal processing.

However, when the reproduction is made by means of the MR head, the fluctuation phenomenon of a reproduced waveform occurs upon contact of the MR head and the recording medium as described in IEEE Transactions on Magnetics, Vol. 27, No. 6, November 1991, pp. 4503 to 4508; Vol. 28, No. 5, September 1992, pp. 2731 to 2732; and Vol. 28, No. 5, September 1992, pp. 2548 to 2550. A cause thereof is that the MR head is a resistance body and a resistance value thereof is varied due to the temperature dependency of the resistor since heat is produced by friction when the MR head comes into contact with the recording medium. On the other hand, in the reproduction method of a signal from the MR head, the variation of the resistance of the MR element is detected and accordingly variation of the resistance due to the temperature is also detected and reproduced. Thus, although an amplitude of the reproduced signal is varied, a central voltage thereof is varied and it is regarded as the fluctuation phenomenon of the reproduced waveform.

U.S. Pat. No. 4,914,398 issued on Apr. 3, 1990 discloses a method of eliminating the above deficiency. In this method, an envelope waveform of a reproduced signal is detected to obtain a central voltage of the envelope signal and the central voltage waveform is then smoothed by a nonlinear adaptive filter. However, the filter possesses the characteristic that the smoothing is not made for variation of the central voltage waveform due to the thermal asperity. The central voltage waveform thus obtained is subtracted from the reproduced signal to thereby eliminate the fluctuation of the reproduced waveform due to the thermal asperity.

SUMMARY OF THE INVENTION

A rising time of the thermal asperity is about 0.1 µs, while a follow-up time for the rise in the above method is about 0.3 µs, so that compensation cannot be made for about 0.2 µs.

Thus, in the ECC (Error Code Correction), the error correction in the uncompensable portion is made to thereby restore the reproduced information. However, since a bit length that the error correction by the ECC can be made is determined, the processable time range is shortened when the data transfer speed is high. In other words, there is a problem that when the processable range of the error correction is reduced to less than 0.2 µs, the uncompensable portion of the thermal asperity cannot be covered by the ECC and a reproduction error occurs.

In order to produce a compensation signal of the thermal asperity, an envelope detection circuit using the charge and discharge of a capacitor is employed. In the envelope detection circuit, variation of the thermal asperity cannot be followed in the natural charge and discharge. Thus, there is provided means for charging and discharging a current forcedly only for a portion where the thermal asperity exists.

A first aspect of the present invention resides in (1) a magnetic recording and reproducing apparatus which reproduces information recorded in a magnetic recording medium in the form of magnetization transition by a magnetic reproducing head using a magneto-resistive element and detects variation of a resistance of the magneto-resistive element to produce a reproduced signal, comprising a processing circuit provided in a reproduction circuit for compensating for a phenomenon that an amplitude of the reproduced signal is little varied and a level of the reproduced signal is varied.

A second aspect of the present invention resides in (2) a magnetic recording and reproducing apparatus which reproduces information recorded in a magnetic recording medium in the form of magnetization transition by a magnetic reproducing head using a magneto-resistive element and detects variation of a resistance of the magneto-resistive element to produce a reproduced signal, comprising a processing circuit provided between a reproduction amplifier circuit and an AGC (Automatic Gain Controlled amplifier) circuit for compensating for a phenomenon that an amplitude of the reproduced signal is little varied and a level of the reproduced signal is varied.

A third aspect of the present invention resides in (3) a magnetic recording and reproducing apparatus which reproduces information recorded in a magnetic recording medium in the form of magnetization transition by a magnetic reproducing head using a magneto-resistive element and detects variation of a resistance of the magneto-resistive element to produce a reproduced signal, comprising a processing circuit provided in an output side of an AGC for compensating for a phenomenon that an amplitude of the reproduced signal is little varied and a level of the reproduced signal is varied and a circuit system in which an output of a reproduction amplifier circuit is branched and which detects a phenomenon that an amplitude of the reproduced signal is little varied and a level of the reproduced signal is varied and produces an output to an AGC and a VFO (Variable Frequency Oscillator).

A fourth aspect of the present invention resides in (4) a magnetic recording and reproducing apparatus according to the above item (3), comprising a circuit system for detecting a phenomenon that an amplitude of the reproduced signal is little varied and a level of the reproduced signal is varied and including first means for reproducing an upper envelope of a signal, second means for reproducing a lower envelope of the signal, third means for controlling the first and second means to follow sudden variation of the envelope, fourth means for reproducing an amount of variation of the level of the reproduced signal from the first and second means, fifth means for producing a voltage higher than a DC voltage of the fourth means, sixth means supplied with outputs of the fifth and fourth means for comparing levels thereof to produce digital data, seventh means for producing a voltage lower than the DC voltage of the fourth means, eighth means supplied with branched outputs of the seventh and fourth means for comparing levels thereof to produce digital data, ninth means for inverting a logic of the digital data produced by the sixth means, tenth means for producing an AND signal of outputs of the ninth and eighth means, and eleventh means for delaying an output of the tenth means, the output of the tenth means being supplied to the AGC circuit, an output of the eleventh means being supplied to the VFO circuit.

A fifth aspect of the present invention resides in (5) a magnetic recording and reproducing apparatus according to (3) above, comprising a circuit system for detecting a phenomenon that an amplitude of the reproduced signal is little varied and a level of the reproduced signal is varied and including first means for reproducing an upper envelope of a signal, second means for AC coupling an output of the first means by means of a capacitor, third means for producing a voltage higher than a DC voltage of the second means, fourth means supplied with outputs of the third means and the second means for comparing levels thereof to produce digital data, fifth means for producing a voltage lower than the DC voltage of the second means, sixth means supplied with branched outputs of the fifth means and the second means for comparing levels thereof to produce digital data, seventh means for inverting a logic of the digital data produced by the fourth means, eighth means for producing an AND signal of outputs of the seventh and sixth means, and ninth means for delaying an output of the eighth means, the output of the eighth means being supplied to the AGC circuit, an output of the ninth means being supplied to the VFO circuit.

A sixth aspect of the present invention resides in (6) a magnetic recording and reproducing apparatus according to (3) above, wherein the circuit system which branches an output of a reproduction amplifier circuit and detects a phenomenon that an amplitude of the reproduced signal is little varied and a level of the reproduced signal is varied produces an output signal for changing over a gain of the AGC to be fixed or variable.

A seventh aspect of the present invention resides in (7) a magnetic recording and reproducing apparatus according to (3) or (6) above, wherein the circuit system which branches an output of a reproduction amplifier circuit and detects a phenomenon that an amplitude of the reproduced signal is little varied and a level of the reproduced signal is varied produces an output signal for changing over an oscillation frequency of the VFO to be held or variable.

An eighth aspect of the present invention reside in (8) a magnetic recording and reproducing apparatus according to any one of (1) to (7) above, wherein when a reproduction error occurs, a reading operation is made again.

A ninth aspect of the present invention resides in (9) a magnetic recording and reproducing apparatus comprising a processing circuit for compensating for a phenomenon that an amplitude of a reproduced signal is little varied and a level of the reproduced signal is varied and including first means supplied with a signal in which an amplitude of a reproduced signal thereof is little varied and a level of the reproduced signal thereof is varied for reproducing an upper envelope of the signal, second means for reproducing a lower envelope of the signal, third means for controlling the first and second means to follow sudden variation of the envelope, fourth means for reproducing an amount of variation of the level of the reproduced signal from the first and second means, fifth means for passing a signal having a sudden level variation and a large amount of variation of an output signal of the fourth means and removing other signals, sixth means for delaying an input signal, and seventh means for compensating for level variation of the reproduced signal by subtracting or adding an output of the fifth means from or to an output of the sixth means.

A tenth aspect of the present invention resides in (10) a magnetic recording and reproducing apparatus according to (9) above, wherein a sum of times required for the first or second means, the fourth means and the fifth means is set as a delay time of the sixth means.

An eleventh aspect of the present invention resides in (11) a magnetic recording and reproducing apparatus comprising a circuit for detecting an envelope waveform from a signal having a phenomenon that an amplitude of a reproduced signal is little varied and a level of the reproduced signal is varied by using charge and discharge of a condenser, and including an envelope waveform detection circuit having a circuit portion connected to a condenser for performing forced charge and discharge in a portion where a level of the reproduced signal is suddenly varied.

A twelfth aspect of the present invention resides in (12) a magnetic recording and reproducing apparatus comprising a circuit portion for reproducing an envelope waveform of a reproduced signal by using charge and discharge of a condenser, and including a circuit in which an input signal is inputted to one terminal of a differential amplifier of first means and an output of the other input terminal side is inputted to a voltage follower circuit constituting second means, a diode constituting third means being connected to an output of the second means, a capacitor of fourth means being connected to an output side of the third means, the other terminal of the capacitor of the fourth means being connected to a power supply, a point connecting the third and fourth means being connected to an input terminal opposite to the terminal to which the input signal of the differential amplifier of the first means is inputted, an envelope waveform being subjected to feedback to reproduce the same envelope voltage as an envelope voltage of the input signal being reproduced.

A thirteenth aspect of the present invention resides in (13) a magnetic recording and reproducing apparatus comprising a portion for controlling a circuit for reproducing an envelope waveform of a reproduced signal by using charge and discharge of a capacitor, and including a thermal asperity detection control circuit including first means for detecting envelope variation which cannot be followed when a waveform having envelope variation which cannot be followed by means of natural charge and discharge current of the capacitor is inputted, and second means for supplying forced charge and discharge current to the capacitor in the envelope variation portion which cannot be followed.

A fourteenth aspect of the present invention resides in (14) a magnetic recording and reproducing apparatus according to (13) above, wherein the portion for controlling a circuit for reproducing an envelope waveform of a reproduced signal by using charge and discharge of a capacitor includes an input signal amplitude adaptation circuit for detecting a magnitude of a bias current when the forced charge and discharge current to the capacitor does not flow and controlling so that the magnitude of the current becomes constant irrespective of an amplitude of the reproduced signal of the input signal.

A fifteenth aspect of the present invention resides in (15) a magnetic recording and reproducing apparatus comprising an adaptive amplitude filter including first means having forced and pulled-out current sources, an output of the first means being a collector of a transistor, second means connected to the output of the first means and constituted by a non-linear element for attaining switching operation, third means connected to the first means to supply a bias voltage to the second means, fourth means for connecting the third means and the second means, and fifth means connected to the fourth means and the second means to hold a voltage.

A sixteenth aspect of the present invention resides in (16) a magnetic recording and reproducing apparatus according to (15) above, wherein the second means of the adaptive amplitude filter includes a transistor.

A seventeenth aspect of the present invention resides in (17) a magnetic recording and reproducing apparatus comprising a reproduction circuit system using a processing circuit for compensating for a phenomenon that an amplitude of a reproduced signal is little varied and a level of the reproduced signal is varied, and including a discrimination circuit system using a maximum likelihood detection and a partial response or an amplitude discrimination (detection) circuit system or a phase discrimination circuit (peak detection) system.

According to the present invention, electric charges of the capacitor in the envelope detection circuit are forcedly charged and discharged to be able to reduce a rising time of the thermal asperity compensation signal to less than 0.3 μs.

DESCRIPTION DETAILED

A magnetic recording and reproducing apparatus can be applied to all of apparatuses which reproduce a signal by means of a magneto-resistive head (MR head) such as a magnetic tape apparatus, a floppy apparatus, a digital VTR apparatus, a magnetic card reading apparatus and the like, while an embodiment is described with reference specifically to a case where the magnetic recording and reproducing apparatus is applied to the magnetic disk apparatus.

Figure 2:
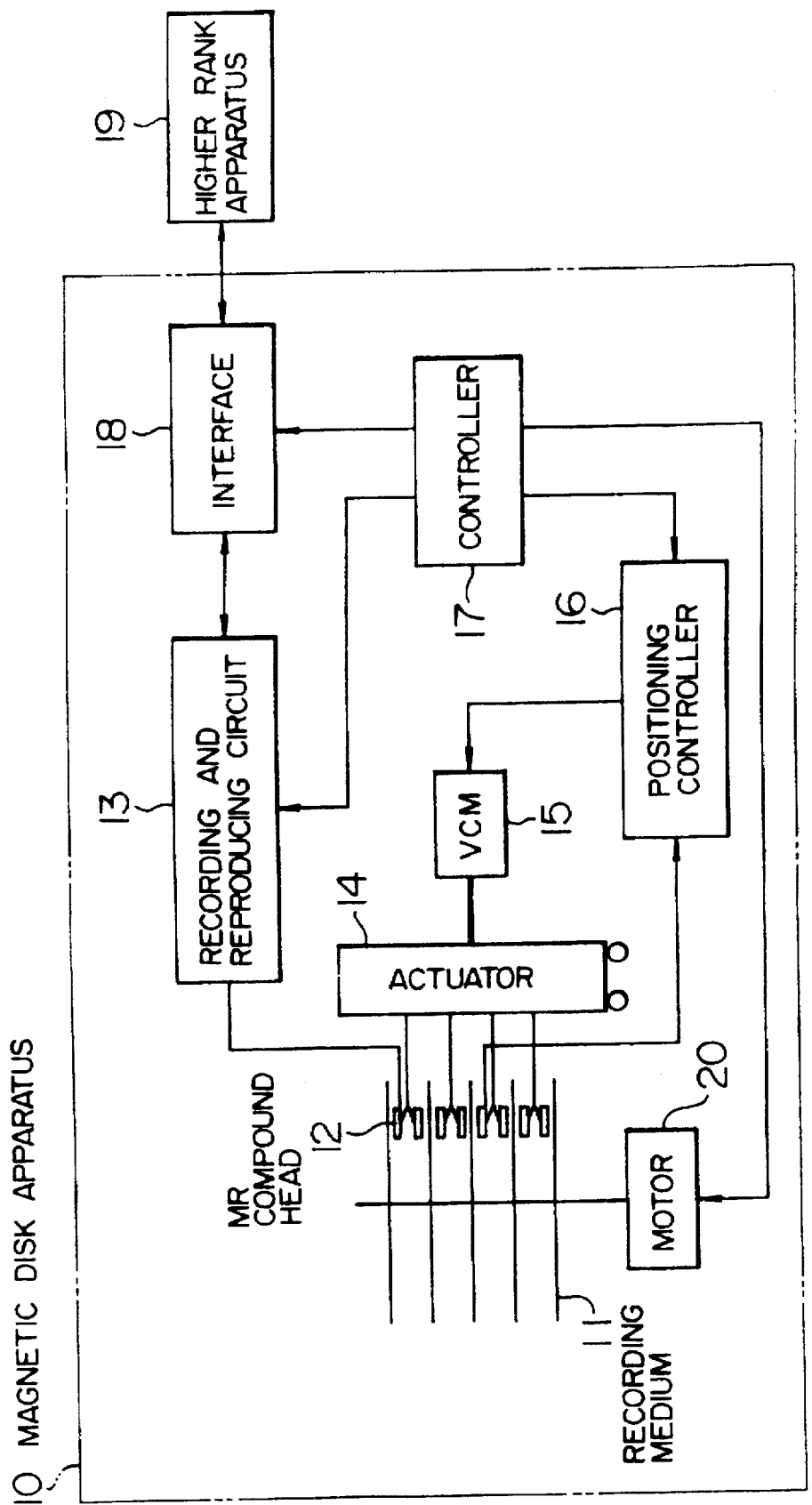
FIG. 2 is a schematic diagram illustrating a basic configuration of a magnetic disk apparatus.

Referring now to FIG. 2, a configuration of a magnetic disk apparatus is described. The magnetic disk apparatus 10 includes a single or a plurality of magnetic recording media 11, at least one MR compound head 12 disposed above each surface of the magnetic recording media 11 and including a combination of an inductive head for recording and a MR head for reproduction, a recording and reproducing circuit 13 for performing recording and reproducing by means of the MR compound head 12, an interface circuit 18 for performing input/output of data between a higher rank machine 19 and the apparatus, an actuator 14 for mechanically supporting the MR compound heads 12 and transporting the MR compound head 12 to a predetermined radial position on the magnetic recording medium 11, a voice coil motor (VCM) 15 for driving the actuator 14, a positioning controller 16 which receives servo information by means of the MR compound head 12 and controls to move the MR compound head to a predetermined radial position of the magnetic disk, and a controller 17 for controlling the recording and reproducing circuit 13, the interface 18, the positioning controller 16 and a motor 20 for rotating the magnetic recording media 11.

Figure 3:
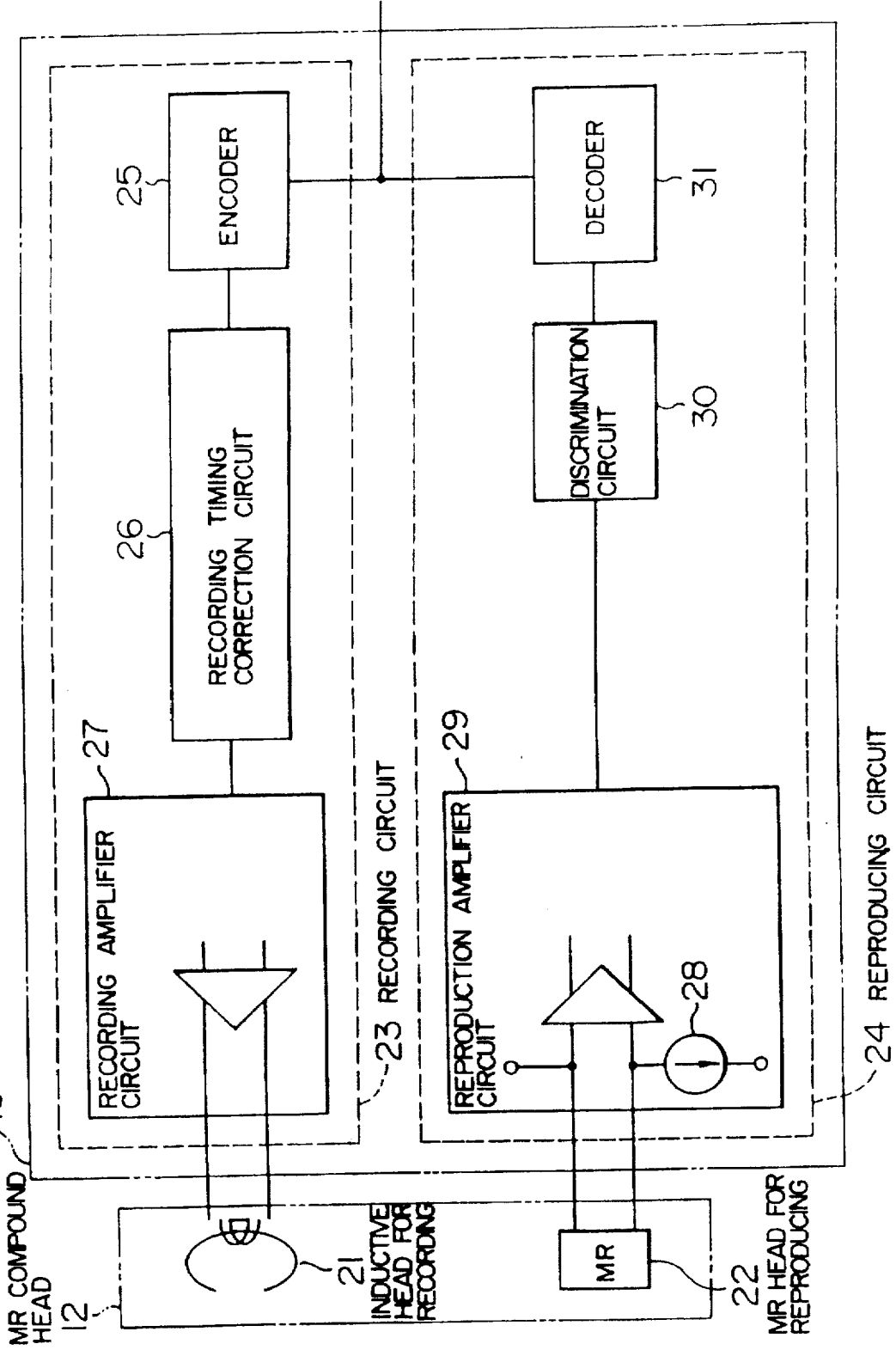
FIG. 3 is a schematic diagram illustrating a conventional magnetic recording and reproducing circuit system.

Referring now to FIG. 3, the MR compound heads 12 and the recording and reproducing circuit 13 are described. The MR compound head 12 includes in a combination a magnetic head (inductive head) 21 for recording information in the magnetic recording medium 11 and a magnetic head (MR head) 22 formed of a magneto-resistive element for reproducing recorded information.

The recording and reproducing circuit 13 includes a recording circuit 23 for performing recording by means of the inductive head 21 and a reproducing circuit 24 for performing reproducing by means of the MR head 22.

The recording circuit for the inductive head 21 includes an encoder circuit 25 for encoding data inputted through the interface 18 into an effectively recordable code, a recording timing correction circuit (write precompensation circuit) 26 for correcting a recording timing in the record code, and a recording amplifier circuit 27 for converting the record code into polarity reversed current to supply a recording current to the inductive head 21.

The MR head 22 utilizes the magneto-resistive effect of the magneto-resistive element which is magnetized by a magnetic field from the medium to thereby vary an electric resistance of the element in accordance with the magnitude of the magnetization. Thus, the reproducing circuit of the MR head 22 supplies a constant current 28 named a sense current to the MR head 22 to detect variation of a resistance of the MR head 22 and detects a variation of a voltage generated across the MR head 22 at this time to produce it as a reproduced signal. The reproducing circuit includes a reproduction amplifier circuit 29 for removing a DC offset voltage of the reproduced signal and amplifying it, a discrimination circuit 30 for discriminating a digital data "0" or "1" from the amplified signal, and a decoder 31 for decoding an output of the discrimination circuit 30. The output of the reproducing circuit is transferred through the interface 18 to the higher rank apparatus 19.

Referring now to FIGS. 1, 4 to 7 and 12 to 14, a first embodiment of the present invention is now described.

Figure 4:
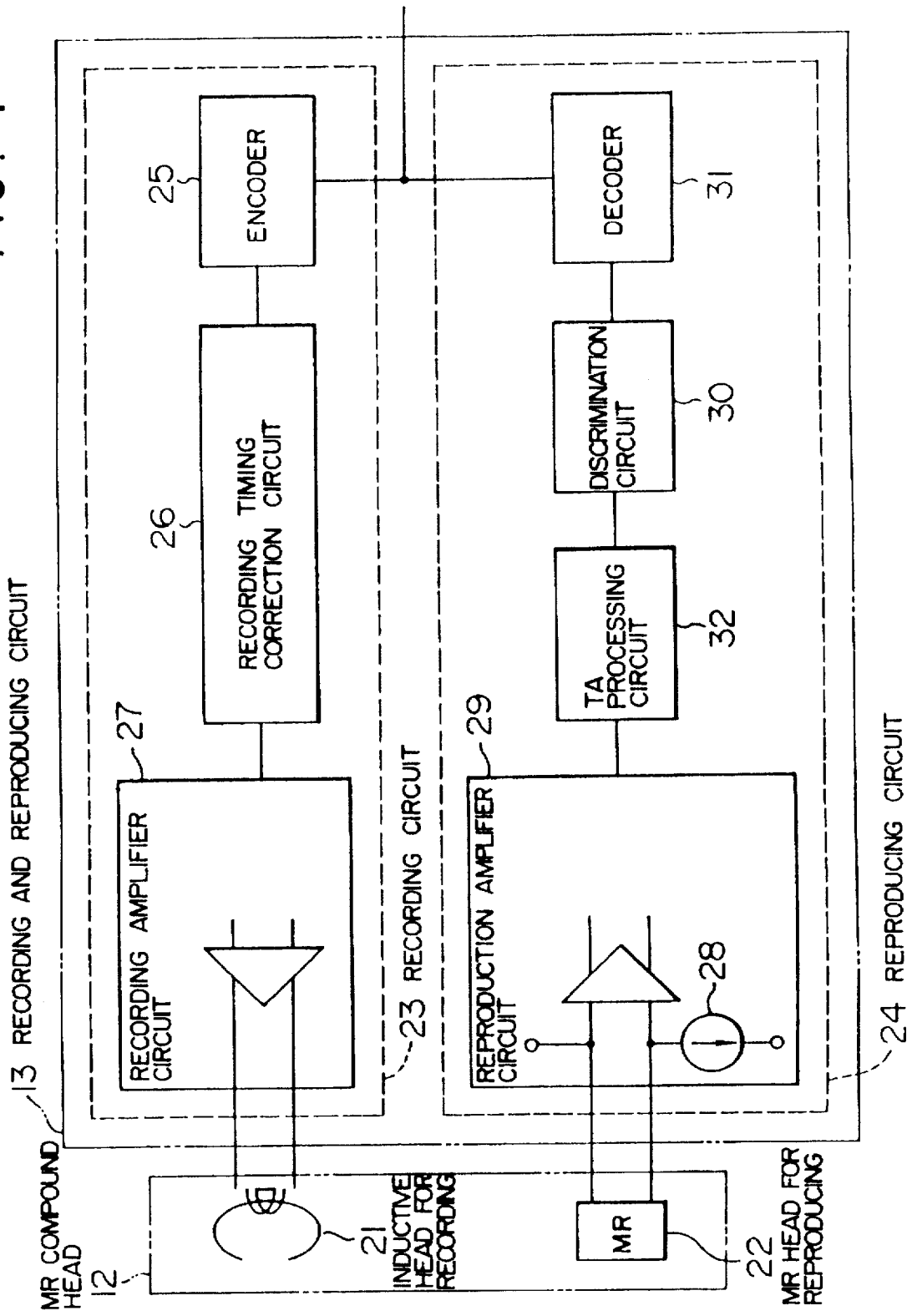
FIG. 4 is a schematic diagram illustrating an embodiment of a recording and reproducing circuit system.
Figure 5:
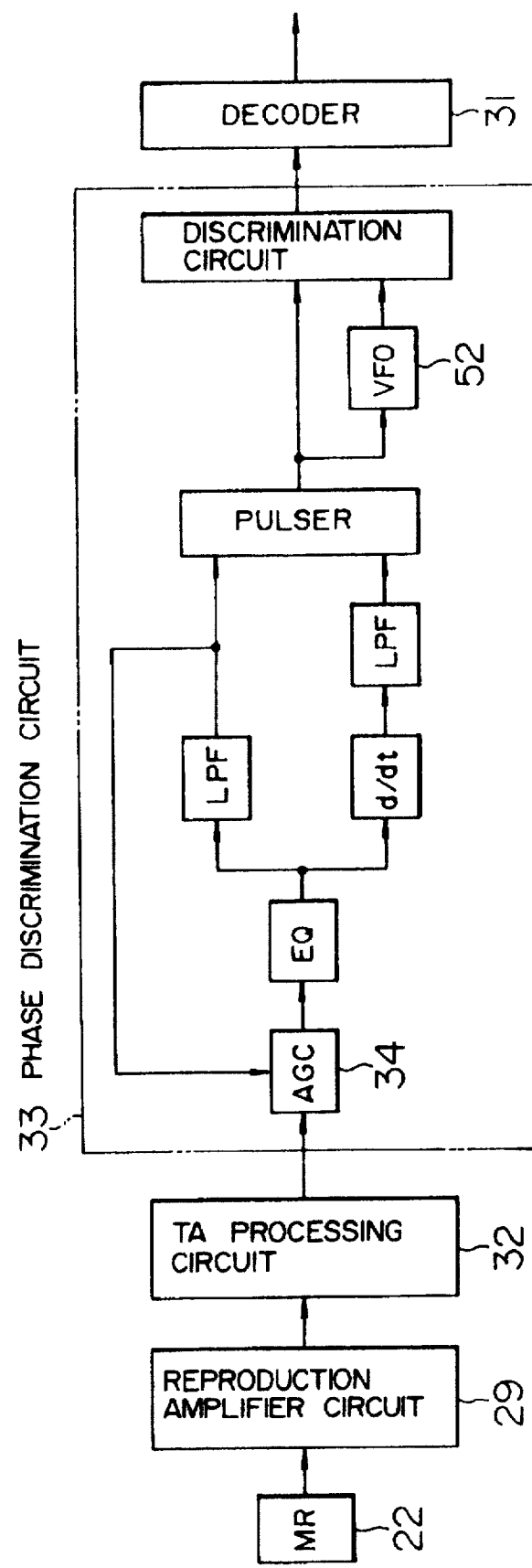
FIG. 5 is a schematic diagram illustrating a first embodiment applied to a phase discrimination circuit system.

FIG. 4 shows an insertion position of a thermal asperity processing circuit (hereinafter abbreviated to as TA processing circuit) 32. As apparent from the comparison with FIG. 3, the TA processing circuit 32 is inserted between the reproduction amplifier circuit 29 and the discrimination circuit 30. FIG. 5 shows a configuration of the MR head 22 for reproduction, the reproduction amplifier circuit 29, the TA processing circuit 32, the discrimination circuit 30 and the decoder circuit 31 in the case of the phase discrimination system. In other words, in an amplitude discrimination system (including a partial response maximum likelihood decoding discrimination system), a portion of the discrimination circuit may be replaced by the discrimination system.

Referring now to FIG. 5, the embodiment in the case of the phase discrimination system is described. The signal reproduced by the MR head 22 and having the thermal asperity is amplified by the reproduction amplifier circuit 29 and is supplied to the TA processing circuit 32. The TA processing circuit 32 compensates for only the thermal asperity to remove fluctuation in the reproduced signal. The reproduced signal having no fluctuation is supplied to an automatic gain controlled amplifier (AGC) 34 of the phase discrimination circuit 33. The process subsequent to the AGC is the normal phase discrimination process. The reason that the TA processing circuit 32 is inserted before the AGC 34 is as follows. When the thermal asperity occurs, an amplitude detection portion of the AGC judges that the reproduced the amplitude is rapidly increased and control for reducing the amplification degree of the AGC is performed. Accordingly, since the signal amplitude is small even if the thermal asperity is compensated after the AGC 34, it is a cause for error in the reproduction. Thus, by providing the TA processing circuit before the AGC 34, the amplitude detection of the AGC is performed for the reproduced signal having no thermal asperity, so that correct gain control is attained.

The configuration of the TA processing circuit shown in FIG. 5 is now described with reference to FIGS. 1 and 6.

A differential reproduced signal amplified by the reproduction amplifier circuit 29 is supplied to an input terminal 35. In the TA processing circuit, the reproduced signal is supplied through a buffer amplifier 36 to a delay circuit 37, a TA detection controller 38, an upper envelope detection circuit 39 and a lower envelope detector 40. The upper envelope detection circuit 39 reproduces an upper envelope waveform of the reproduced signal containing the thermal asperity. The lower envelope detection circuit 39 reproduces a lower envelope waveform of the reproduced signal containing the thermal asperity. Generally, the envelope circuit uses a peak hold or charging and discharging of a capacitor to reproduce an envelope. However, the envelope circuit is configured not to follow the thermal asperity functionally on the supposition that the envelope is not varied greatly and rapidly. Accordingly, in the system in which charging and discharging of condenser is used to reproduce the envelope, there is provided the TA detection controller 38 for controlling the envelope circuits 39 and 40 to be able to follow rapid variation by forcedly charging and discharging the capacitor only for variation of the rapid envelope occurring by the thermal asperity.

Envelope waveforms obtained by the upper envelope detection circuit 39 and the lower envelope detection circuit 40 are supplied to an averaging circuit 41 in which an average voltage at each time is calculated. The reason why such a method is used is that fluctuation of the reproduced signal can be detected to subtract it from the input signal to thereby compensate for the fluctuation since the thermal asperity is a phenomenon that a level of the reproduced signal fluctuates and an amplitude of the reproduced signal is little varied. When a signal for correcting the fluctuation is a signal obtained from one of the envelopes, influence of the modulation noise (amplitude modulation mode) due to ununiformity of the surface of the medium and vibration of spacing is received and correction of the thermal asperity and the influence of the modulation noise overlap each other simultaneously. However, by averaging the upper and lower envelopes, influence of the modulation noise can be removed and only correction of the thermal asperity can be made effectively.

Figure 12:
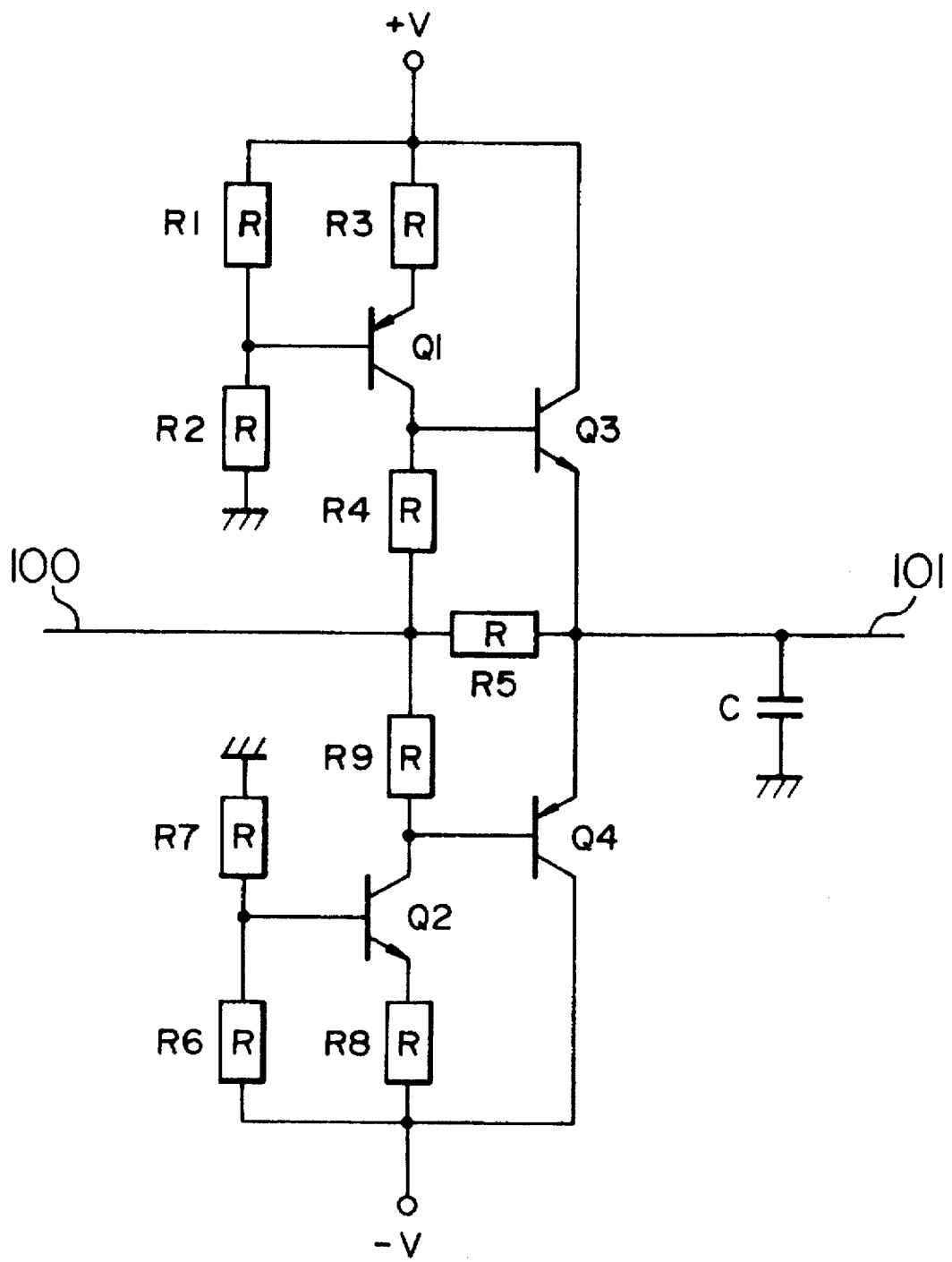
FIG. 12 is a schematic diagram illustrating an adaptive amplitude filter.

An output of the averaging circuit 41 is supplied to an adaptive amplitude filter 42 in which the sag thereof is suppressed and at the same time a variation portion due to the thermal asperity is enhanced to have a steep inclination. The configuration of the amplitude filter 42 is shown in FIG. 12. The configuration and the operation thereof will be described later. An output of the amplitude filter 42 is supplied to a TA elimination circuit 43. The TA elimination circuit 43 is also supplied with a delay signal of the reproduced signal from the delay circuit 37. The delay circuit 37 is to correct a delay due to processing of a portion in which the correction signal of the thermal asperity is produced and match the phase of the thermal asperity in the TA elimination circuit 43. Thus, a compensation signal of the thermal asperity is subtracted from the reproduced signal having the matched phase of the thermal asperity to thereby compensate for the thermal asperity. The aforementioned operation may be performed with only the one-sided signal or by processing the differential signal as shown in FIG. 1 in order to remove the noise in phase.

Figure 1:
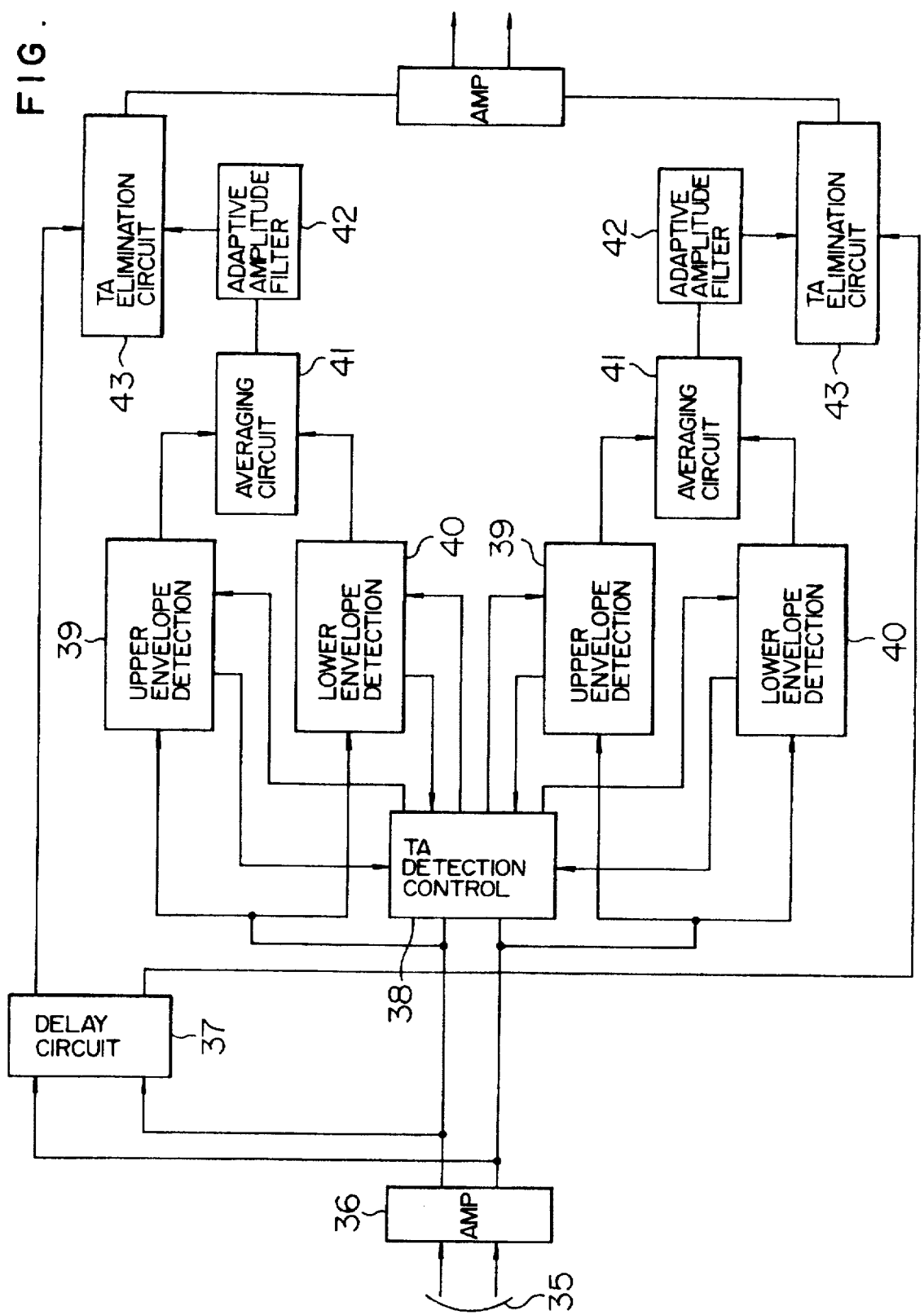
FIG. 1 is a schematic diagram illustrating a TA (Thermal Asperity) processing circuit.
Figure 6:
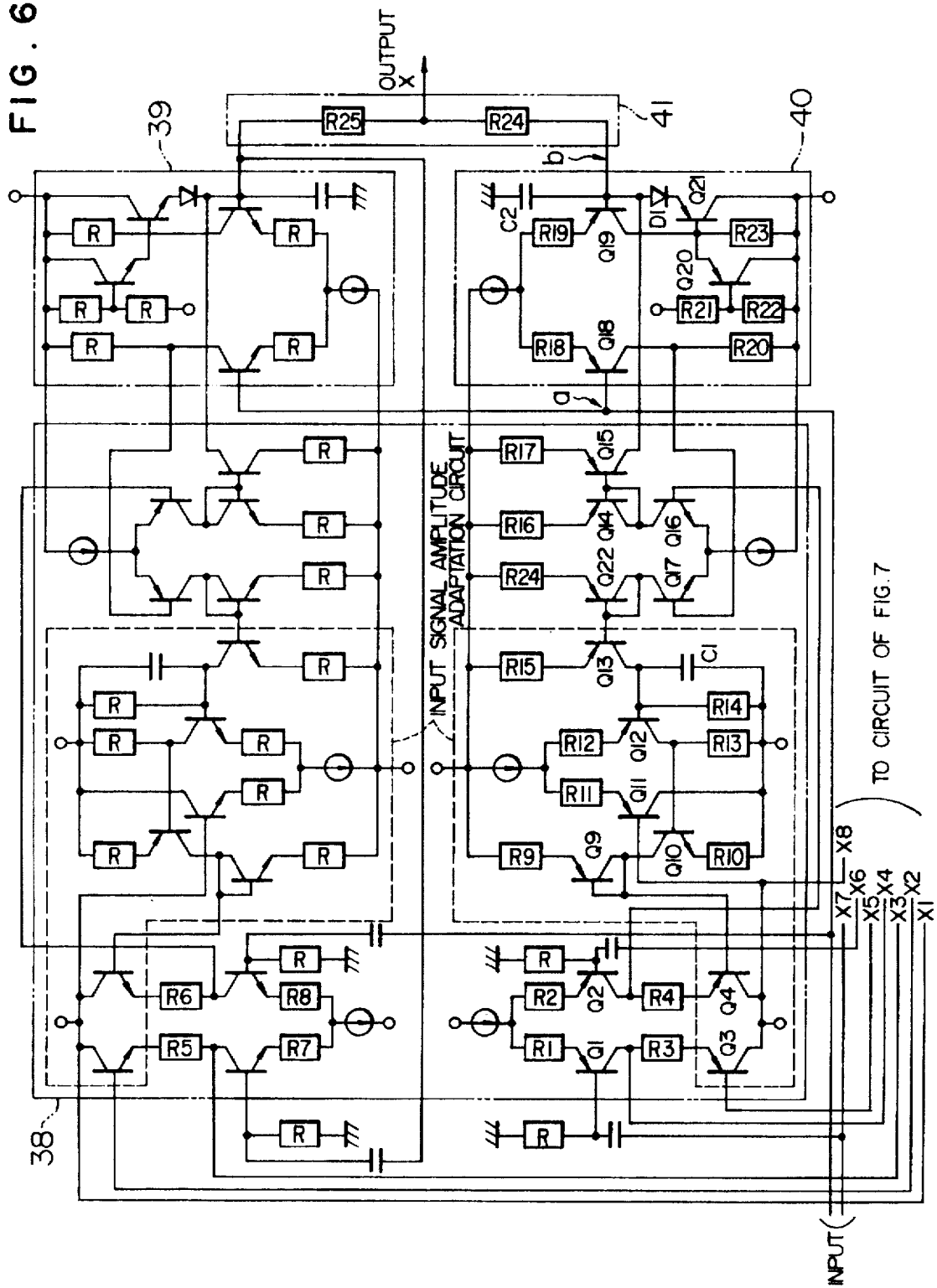
FIG. 6 is a schematic diagram illustrating a TA detection control and envelope detection circuit.
Figure 7:
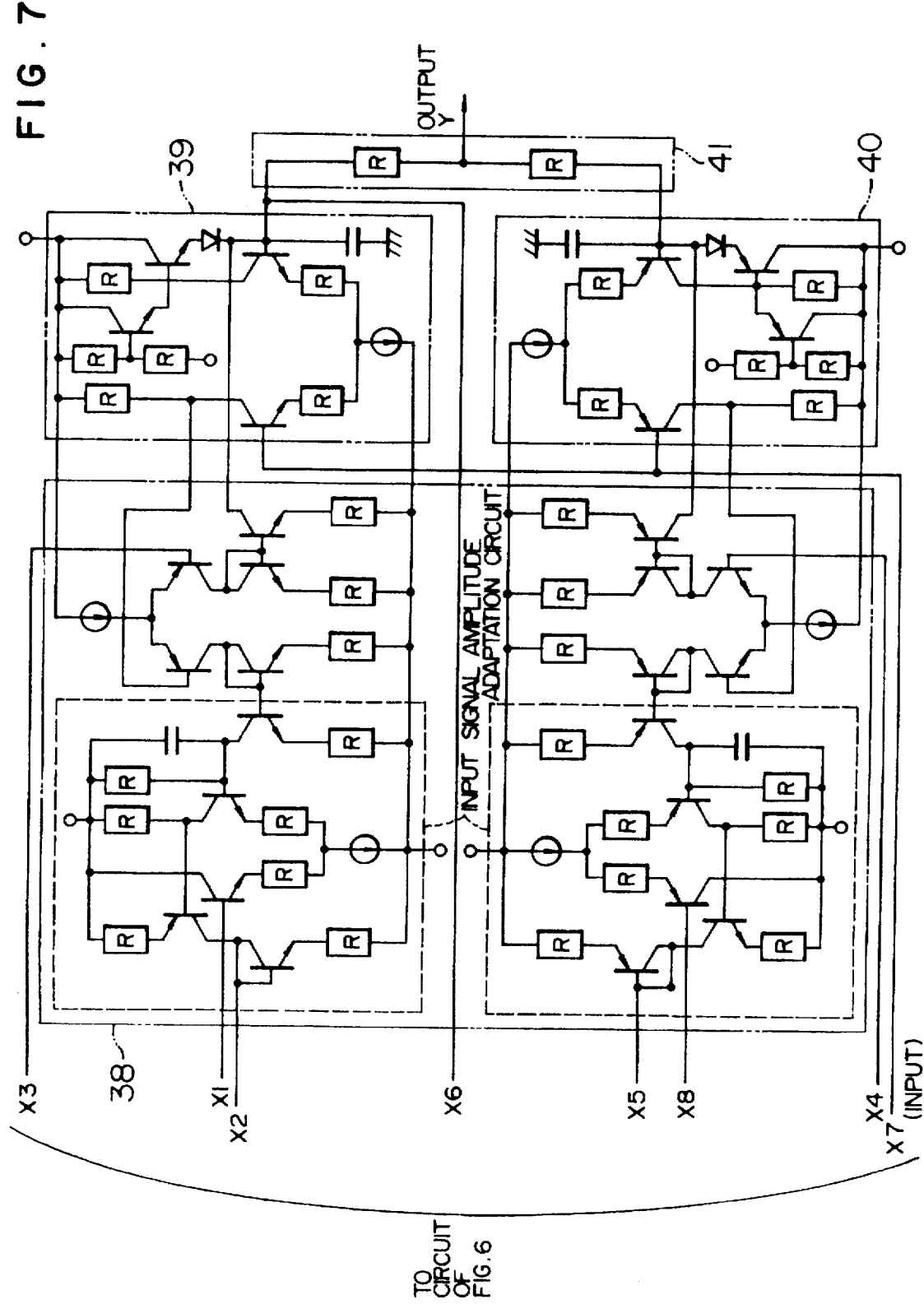
FIG. 7 is a schematic diagram illustrating a TA detection control and envelope detection circuit.

Referring now to FIGS. 6 and 14, an embodiment of the TA detection controller 38, the upper envelope detection circuit 39 and the lower envelope detection circuit 40 of the TA processing circuit shown in FIG. 1 is described.

The envelope detection method is now described by using operation of the lower envelope detection circuit 40 as an example. When a signal is supplied from the input terminal, the signal is supplied to a base of a transistor Q18 of the lower envelope detection circuit 40. The transistor Q18 constitutes a differential amplifier circuit together with a transistor Q19. On the other hand, a potential of a capacitor C2 is applied to a base of the transistor Q19. Considering the initial state of the capacitor C2, no charge is stored in the capacitor and accordingly the voltage is zero. In other words, a lower level is supplied to the base of the transistor Q18, so that a current flows through the transistor Q18 in accordance with a level difference between the transistors Q18 and Q19. Accordingly, a voltage drop across a resistor R23 is reduced and a base voltage of a transistor Q21 is reduced. On the other hand, an emitter of the transistor Q21 is connected through a diode D1 to a capacitor C2 and the base of the transistor Q19. Thus, when a potential difference between the base of the transistor Q21 and the terminal of the capacitor C2 exceeds about 1.4 volts, the transistor Q21 and the diode D1 are turned on and electric charges are taken out from the capacitor C2. In other words, negative charges are stored in the capacitor C2 to thereby reduce the base potential of the transistor Q19. When it is assumed that a ratio of resistances of R23/R19, that is, an amplification degree of the differential amplifier circuit is set to be large, a voltage drop of the amplification degree times is produced across the resistor R23 even if there is a slight base potential between the transistors Q18 and Q19. Accordingly, the above-mentioned operation is repeated so that the convergence operation that the base potential of the transistor Q18 is equal to the base potential of the transistor Q19 is performed.

However, when the base potential of the transistor Q19 is higher than that of the transistor Q19, an increased current flows through the side of the transistor Q19. Thus, the voltage drop across the resistor R23 is increased, so that the base potential of the transistor Q21 becomes high. When the base potential of the transistor Q21 becomes high, the potential difference between the capacitor C2 and the base of the transistor Q21 is smaller than 1.4 V, so that the transistor Q21 and the diode D1 are turned off. Accordingly, the electric charges of the capacitor C2 are not varied and the potential of the capacitor C2 is held. However, actually, positive electric charges are stored in the capacitor C2 by the base current of the transistor Q19 to thereby gradually increase the potential. This condition is shown by waveforms a and b of FIG. 14A and 14B, respectively.

Description is now made to the case where the thermal asperity is inputted. In this case, the followup operation can not be made by only the envelope detection portions and the TA detection control is required.

Figure 14A:
FIGS. 14A, 14B and 14C are diagrams showing waveforms of various portions of the TA processing circuit.
Figure 14B:
Figure 14C:
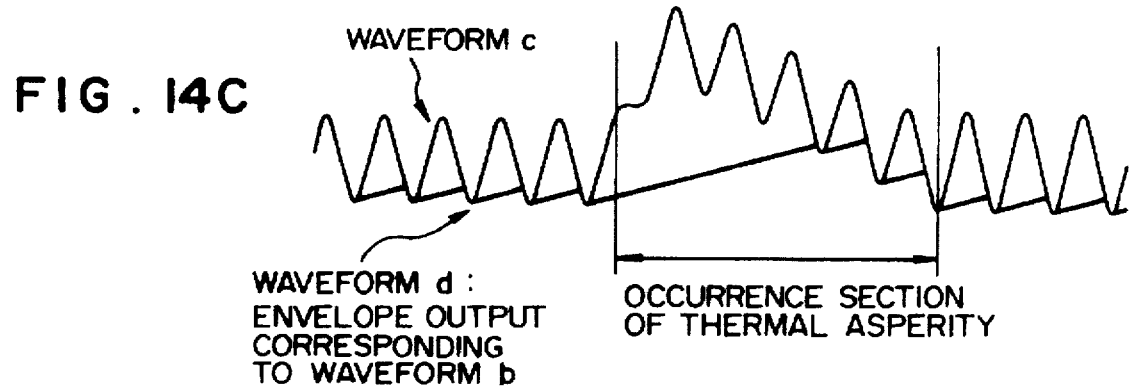

The case where a waveform c shown in FIG. 14C is inputted in the lower envelope detection circuit 40 is now considered. The envelope detection circuits are operated as described above and are to reproduce the lower envelope. On the other hand, a variation rate of the increased potential of the capacitor C2 is determined by a base current of the transistor Q19. However, when the thermal asperity is inputted, variation of the thermal asperity is larger than the variation rate of the increased potential of the capacitor C2. Thus, even if a negative peak of the reproduced signal is applied to the base of the transistor Q18, the base potential of the transistor Q19 is lower than that of the base of the transistor Q18 and accordingly an increased current flows through the transistor Q19. Thus, the potential of the capacitor C2 is determined by the increased potential produced by the base current of the transistor Q19 and the lower envelope cannot be produced as shown by a waveform d of FIG. 14C.

Thus, a charge current forcedly flows in the capacitor C2 in addition to the base current of the transistor Q19 in a portion of the thermal asperity by means of the TA detection control circuit 38. The variation rate of the increased potential of the capacitor C2 is larger than the variation rate of the thermal asperity to thereby always follow the lower peak of the reproduced waveform. With this function, the lower envelope can be reproduced. However, theoretically, when the thermal asperity is varied over the amplitude of the reproduced waveform during one period of the reproduced waveform, the negative peak of the reproduced waveform cannot be detected. That is, the maximum value of the variation rate of the increased potential of the capacitor C2 by the forced charging is a variation rate varying by a value corresponding to the amplitude value of the reproduced waveform during one period of the reproduced waveform. When the variation rate of the increased potential of the capacitor C2 exceeds the maximum value, the lower envelope cannot be reproduced again.

Operation of the above-mentioned function is now described with reference to the circuit diagram of FIG. 6. When the thermal asperity is inputted, a current flows little in the transistor Q18 as described above and a voltage drop occurs little across the resistor R20. In other words, a low level signal is supplied to the base of the transistor Q17.

On the other hand, a reproduced signal pulse is supplied to a transistor Q16 constituting a differential amplifier together with the transistor Q17.

Since an input signal amplitude adaptation circuit is operated to apply a constant potential to bases of transistors Q3 and Q4, an emitter potential of the transistors Q3 and Q4 constituting one reference potential of resistors R3 and R4 is determined. On the other hand, transistors Q1 and Q2 constitute a differential amplifier circuit. The transistor Q1 is supplied with the reproduced signal and the transistor Q2 is supplied with the lower envelope waveform by means of AC coupling. Thus, when a potential at the base of the transistor Q1 is higher than that at the base of the transistor Q2, a voltage drop across the resistor R4 is increased. In other words, a waveform in the form of pulse having an amplitude in accordance with an amplitude of the reproduced signal is supplied to the base of the transistor Q16 connected to the collector of the transistor Q2.

In the differential amplifier constituted by the transistors Q16 and Q17, the base potential of the transistor Q17 remains a low level and the waveform in the form of pulse is supplied to the base of the transistor Q16. Thus, when the waveform in the form of pulse is supplied to the base of the transistor Q16, a level at the base of the transistor Q16 is higher and an increased current flows in the side of the transistor Q16.

A load of the transistor Q16 is a transistor Q14 and a resistor R16. A current flowing through the side of the transistor Q16 also flows through the resistor R16 and a voltage drop occurs across the resistor R16. A base potential of the transistor Q14 is determined by the voltage drop. Transistors Q14 and Q15 and resistors R16 and R17 constitute a current copy circuit. However, resistance values of the resistors R16 and R17 are not necessarily required to be the same. The base potential of the transistor Q14 is supplied to the base of the transistor Q15 and a potential difference defined by the power supply voltage and the emitter potential of the transistor Q15 is applied across the resistor R17. In other words, a current defined by the potential difference and the resistor R17 flows in the collector of the transistor Q15. The collector of the transistor Q15 is connected to the condenser C2 and the collector current of the transistor Q15 is a forced charge current of the capacitor C2. Since a value of the collector current of the transistor Q16 can be selected by selecting a value of the resistor R17, the variation rate of the increased potential by the forced charge current can be selected.

The input signal amplitude adaptation circuit is now described. The circuit described above exhibits the performance thereof on condition that the amplitude of the reproduced signal is large and is substantially constant, while it is necessary to vary the variation rate of the increased potential by the forced charge current in accordance with the amplitude of the reproduced signal in order to exhibit the same performance even when the amplitude of the reproduced signal is small. The reason thereof is that when the variation rate of the increased potential by the forced charge current is large although the amplitude of the reproduced signal is small, a large ringing is caused in the portion of the thermal asperity and the envelope cannot be reproduced. Thus, the adaptation operation corresponding to the amplitude of the input signal that the variation rate of the increased potential by the forced charge current is made small when the amplitude of the reproduced signal is small is required.

Operation is now described by using the embodiment. In the embodiment, a transistor Q22 having a diode connection and a resistor R24 connected to an emitter of the transistor Q22 are connected to the collector of the transistor Q17, and a current flowing in the transistor Q17 is converted into a voltage. At this time, a base potential of the transistor Q22 is applied to the base of a transistor Q13 and a resistance value of a resistor R15 connected to the emitter of the transistor Q13 is made equal to that of the resistor R24 to thereby copy the current flowing in the transistor Q17. A resistor R14 and a capacitor C1 are connected to the collector of the transistor Q13 to supply the copied current.

While the forced charge current flows in the transistor Q15 in the pulse manner, the current does not flow in the transistor Q17 intermittently. Since a copied current of the current flowing in the transistor Q17 flows in the transistor Q13, the current does not flow in the transistor Q13 intermittently in the same manner as the transistor Q17. Thus, the capacitor C1 is inserted in order to smooth the intermittent current and is configured so that an effective current flows in the resistor R14 to produce a voltage drop. A voltage produced across the resistor R14 is supplied to a base of a transistor Q12.

The transistor Q12 and a transistor Q11 constitute a differential amplifier circuit. A resistor R13 is connected to the collector of the transistor Q12, and a voltage produced across the resistor R13 when there is no potential difference between the base of the transistor Q11 and the base of the transistor Q12 is assumed to be V. When the current flowing through the transistor Q17 is reduced, the base voltage of the transistor Q12 is lowered and a potential difference is produced between the base of the transistor Q11 and the base of the transistor Q12. At this time, a voltage proportional to the potential difference between the bases of the transistors Q11 and Q12 is added to the initial voltage drop V across the resistor R13. The voltage produced across the resistor R13 is applied to a base of a transistor Q10 and the voltage is converted into a current by means of a resistor R10 connected to an emitter of the transistor Q10. The current flows through a transistor Q9 connected to a collector of the transistor Q10 and a resistor R9 connected to an emitter of the transistor Q9. A voltage drop corresponding to the current is produced across the resistor R9 and the voltage drop determines a base potential of the transistor Q9 through the emitter of the transistor Q9 having diode connection. The base of the transistor Q4 is connected to a base of the transistor Q9, so that an emitter potential of the transistor Q4 is determined since the transistor Q4 is active. The emitter potential of the transistor Q4 is a reference potential for producing a signal required to flow the forced charge current. This potential can be controlled to thereby control a value of the forced charge current.

Control of the forced charge current in the case where an amplitude of the reproduced signal is varied from a large value to a small value is now described. When the amplitude of the reproduced signal is large, an amplitude of a pulse signal for the forced charge current produced in the resistor R4 is increased. Thus, the emitter voltage of the transistor Q4 is lowered and a base bias voltage of the transistor Q16 is lowered. In the differential amplifier circuit constituted by the transistors Q16 and Q17, the maximum amplitude potential of an input signal to the side of the transistor Q17 is set to be slightly larger than the maximum amplitude potential of an input signal of the transistor Q16, so that the side of the transistor Q17 is maintained to a state where a slight current always flows. At this time, when the thermal asperity is inputted, an increased current flows through the side of the transistor Q16 in a moment and the forced charge current having the same magnitude as that of the increased current flows. At this time, although the current flowing through the side of the transistor Q17 is reduced, the emitter potential of the transistor Q4 is not almost varied since smoothing is performed by the smoothing circuit including the resistor R14 and the condenser C1. Accordingly, in the thermal asperity portion, a necessary forced charge current can be obtained.

When the amplitude of the reproduced signal is assumed to be varied to a small value, the amplitude of the pulse signal for the forced charge current produced in the resistor R4 is made small. Accordingly, if the base bias voltage of the transistor Q16 is the same, a potential difference between the maximum amplitude potential of the input signal to the side of the transistor Q16 and the maximum amplitude potential of the input signal to the side of the transistor Q17 is further increased and the current flowing through the side of the transistor Q17 is increased. At the same time, the current of the transistor Q13 which is the copy of the current of the transistor Q17 is also increased and the voltage produced across the resistor R14 is increased. Accordingly, in the differential amplifier circuit constituted by the transistors Q11 and Q12, the base potential of the transistor Q12 is increased, so that the current flowing through the side of the transistor Q12 is reduced. By reducing the current, the voltage drop produced across the resistor R13 is reduced and accordingly the current flowing through the transistor Q10 is reduced. When the current flowing through the transistor Q10 is reduced, the base potential of the transistor Q9 is increased and at the same time the emitter potential of the transistor Q4 is increased. Since the emitter potential of the transistor Q4 is the base bias potential of the transistor Q16, the maximum amplitude potential of the signal inputted to the side of the transistor Q16 is increased, so that the potential difference between the bases of the transistors Q16 and Q17 is reduced. Accordingly, the current flowing through the side of the transistor Q17 is reduced, so that the state is finally controlled to be the same state as the state in which the amplitude of the reproduced signal is large.

Further, at this time, when the thermal asperity is inputted, the pulse signal having the amplitude in accordance with the amplitude of the reproduced signal is inputted and accordingly the forced charge current flows in accordance with the amplitude of the reproduced signal.

The resistance value of the resistor R17 is varied in accordance with the magnitude of the thermal asperity to vary the forced charge current.

The adaptive amplitude filter shown in FIG. 1 is now described. The adaptive amplitude filter possesses the characteristics that the sag produced in the envelope detection circuit is removed and variation of a voltage by the thermal asperity passes as it is. The configuration and operation of the amplitude filter are described with reference to FIGS. 12 and 13.

The amplitude filter is configured as follows. Resistors R1, R2 and R3 and a transistor Q1, and resistors R6, R7 and R8 and a transistor Q2 are current sources, respectively, and values of currents flowing through the transistors Q1 and Q2 are made equal to each other. Resistors R4 and R9 serve to produce a bias voltage between a base and an emitter of transistors Q3 and Q4. A resistor R5 and a capacitor C constitute an integration circuit, the time constant of which is long (a cut-off frequency is low). With this characteristic, a high frequency component of the input signal is removed. The transistor Q3 and Q4 constitute switching elements which are turned on and off when a product of a variation rate and an amplitude of the input signal exceeds a certain value.

Figure 13:
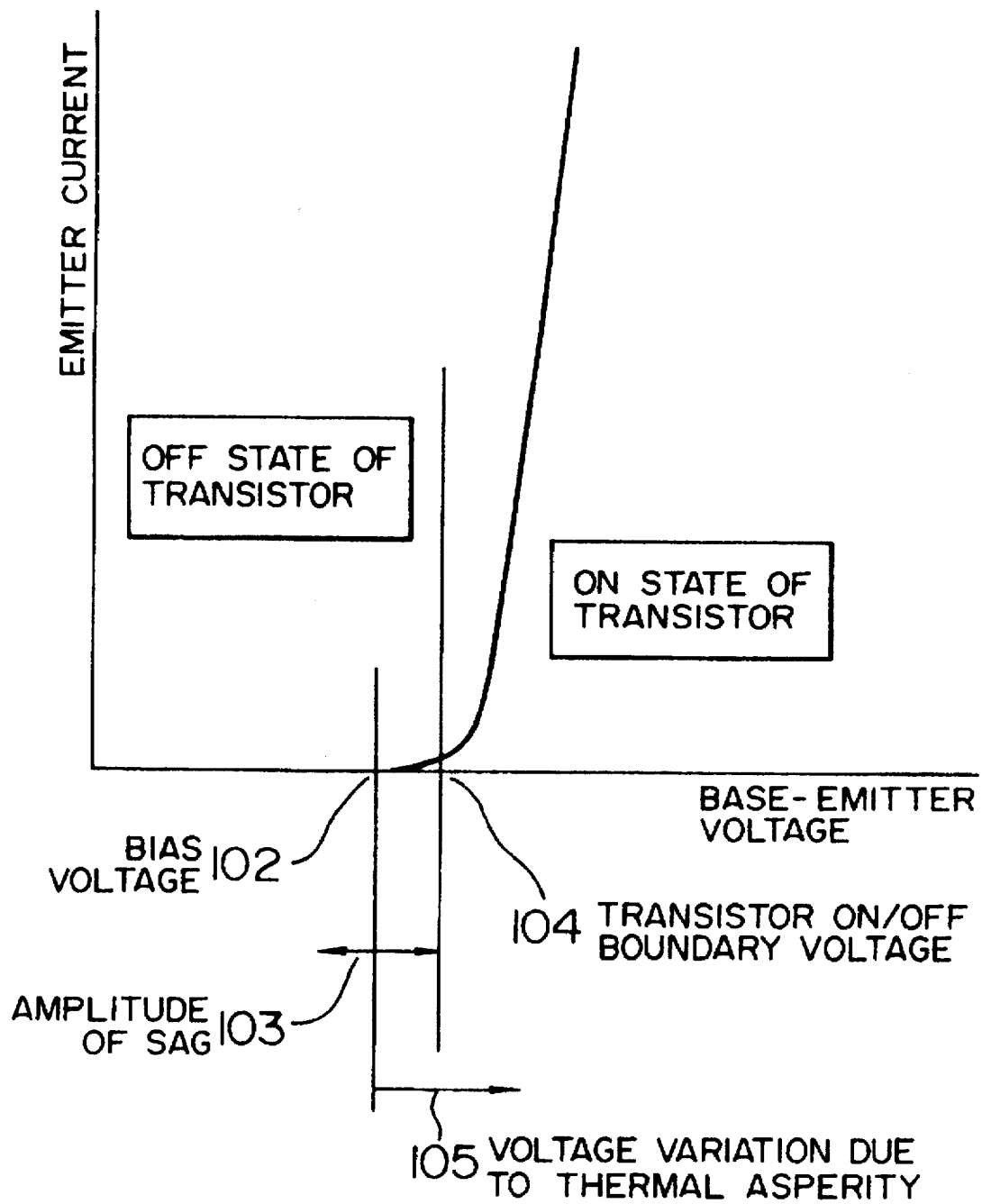
FIG. 13 is a diagram explaining operation of the adaptive amplitude filter.

Operation of the amplitude filter is as follows. FIG. 13 shows a relation of an emitter current versus a voltage between the base and the emitter of the transistors Q3 and Q4. The resistors R4 and R9 and a forced/pulled-out current are determined so that the voltage between the base and the emitter is equal to a voltage 102 between the base and the emitter which is slightly smaller than a voltage 104 between the base and the emitter at a boundary for the on state and the off state of the transistor and the bias voltage 102 between the base and the emitter of the transistors Q3 and Q4 is applied.

When it is assumed that a fixed voltage is supplied to an input terminal 100 and time elapses sufficiently as compared with the time constant determined by the resistor R5 and the capacitor C, the same voltage as the input voltage is charged in the capacitor C. That is, no current flows through the resistor R5. The output signal of the averaging circuit 41 shown in FIG. 1 is supplied to the input terminal 100 as an input signal. The sag produced in the envelope detection is superposed on the input signal. The amplitude of the sag is shown by the range of 103 of FIG. 13. The bias voltage 102 is determined so that the maximum amplitude of the sag at this time does not exceed the boundary voltage for the on state and the off state of the transistor.

With the circuit constant state described above, if a signal on which only the sag is superposed is inputted to the input terminal 100, since the transistors Q3 and Q4 are off, a higher frequency component than a frequency determined by the time constant of the resistor R5 and the capacitor C, that is, the sag is removed and a waveform having no sag is obtained. On the other hand, in the case of the thermal asperity portion, a waveform 105 having a steep variation (variation in a shorter time than the time constant of the resistor R5 and the capacitor C) and a large amount of variation (exceeding the potential difference between the on/off boundary voltage 104 of the transistor and the bias voltage 102) is inputted.

The case where a signal in the case where the thermal asperity is varied to the side of the positive voltage, for example, is inputted is now described. Since sudden variation due to the thermal asperity is shorter than the time constant of the resistor R5 and the capacitor C, a voltage variation of the capacitor cannot follow it and it can be regarded as a constant voltage equivalently. Accordingly, a varied voltage of the input signal is applied to the resistor R5. On the other hand, since the resistors R4 and R9 are connected to the collectors of the transistors Q1 and Q2 constituting the current sources, respectively, and the current values thereof do not change, the bias voltages produced by the resistors R4 and R9 are not changed. Accordingly, the input voltage are applied to the bases of the transistors Q3 and Q4 as it is. Further, since the emitter voltage of the transistor Q3 is the same as the voltage of the capacitor, the emitter voltage is fixed. Thus, the bias voltage between the base and the emitter of the transistor Q3 is a sum of the voltage produced across the resistor R4 and the varied voltage of the input signal applied to the resistor R5. In this case, since the sum voltage exceeds the on/off boundary voltage 104 of the transistor, the transistor Q3 is turned on and a charge current flows into the capacitor C through the transistor Q3. The resistor for the time constant of the integration circuit at this time is an emitter resistance (re) of the transistor Q3 instead of the resistor R5, and accordingly when the resistor R5 is set to be smaller than the emitter resistance (that is, R5>re), the time constant becomes short equivalently. That is, it appears as if the amplitude filter has a high cut-off frequency. With this operation, the varied voltage waveform by the thermal asperity passes through the filter.

Further, as an effect of this circuit system, since the on/off operation of the transistor is used, a main current for the charge or discharge current of the capacitor is the collector current of the transistor. Accordingly, unlike the system in which a portion of a current from a current source is used as the charge or discharge current of the condenser as the adaptive filter described in U.S. Pat. No. 4,914,398 issued Apr. 3, 1990, the current of the current source is used only for production of the bias voltage and accordingly even when the charge or discharge current of the capacitor is supplied, the stable bias voltage is obtained. Thus, the follow-up characteristic to the varied voltage waveform by the thermal asperity is improved and the circuit processing time can be shortened.

When the time constant of the resistor R5 and the capacitor C is shorter than the period of the sag, the integration circuit constituted by the resistor R5 and the capacitor C can follow even if the varied voltage is small and accordingly the input waveform is produced as it is. Hence, the time constant of the resistor R5 and the capacitor C is required to be set longer than the period time of the sag.

Figure 8:
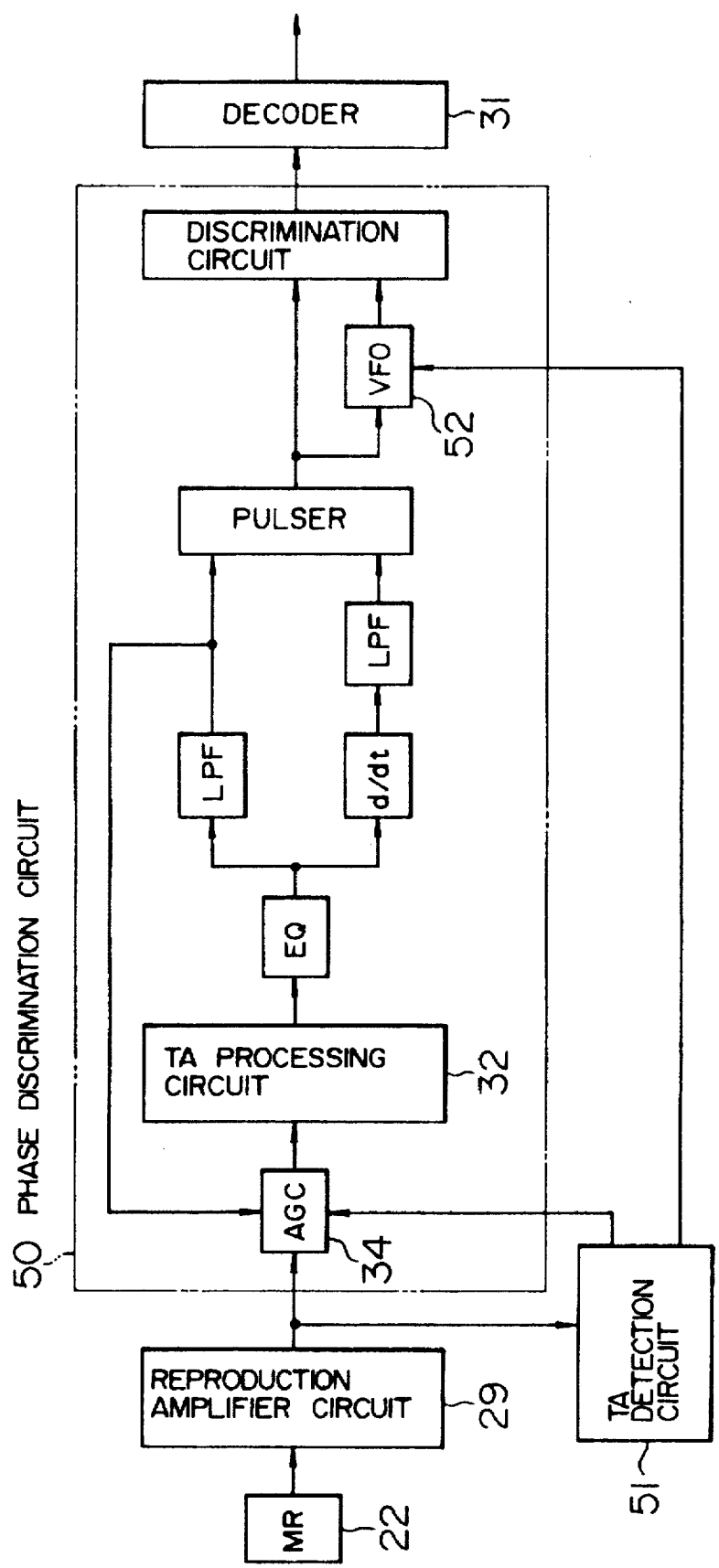
FIG. 8 is a schematic diagram illustrating a second embodiment applied to a phase discrimination circuit system.

A second embodiment is now described with reference to FIG. 8. The embodiment is characterized in that the thermal asperity processing circuit 32 is provided behind the AGC 34 to constitute a novel phase discrimination circuit 50. Generally, when the reproduced signal containing the thermal asperity passes through the AGC, a wrong amplitude is detected in the reproduced signal amplitude detection portion and there occurs a phenomenon that the gain of the AGC is changed adversely. Thus, there is provided a TA detection circuit 51 for fixing the amplitude detection portion of the AGC 34 and controlling the AGC 34 to be operated as an amplifier circuit having a fixed gain while the thermal asperity occurs. The TA detection circuit 51 is inserted in the circuit so that an output of the reproduction amplifier circuit 29 branched from a path connecting the reproduction amplifier circuit 29 to the AGC 34 is supplied to the TA detection circuit 51 and control signals from the TA detection circuit 51 are supplied to the AGC 34 and the VFO 52.

On the other hand, since a waveform having the uncompensated thermal asperity is inputted, the dynamic range of the AGC 34 must be enlarged. However, when the unexpected thermal asperity is produced, there is a possibility that the AGC 34 is saturated. If the AGC is saturated, the reproduced signal is not restored though the thermal asperity is compensated by the TA processing circuit 32. Accordingly, even if the waveform conversion to the peak pulse for performing the phase discrimination is made, the occurrence position is mistaken. On the other hand, the variable frequency oscillator (VFO) 52 for preparing a reference time window for discriminating "1" and "0" constitutes a phase-locked loop together with the peak pulse to determine an oscillation frequency. Thus, when the occurrence position of the peak pulse is mistaken over a long time, the oscillation frequency or the phase is mistaken and when the peak pulse at a right occurrence position arrives, a reproduction error occurs. Thus, the following two processes are performed.

In the first process, operation of the phase error detection portion is stopped when the thermal asperity occurs, and the oscillation frequency of the VFO 52 is controlled to be maintained to a fixed value. This control is made by the TA detection circuit 51 since the control can be made by the digital signal if occurrence of the thermal asperity can be detected. When the AGC 34 is saturated, the above-mentioned situation occurs and there is a possibility that the reproduction error occurs. In the second process, when the reproduction error occurs, retrial is made to perform rereading.

Since the output of the AGC 34 is inputted to the TA processing circuit 32, the amplitude of the reproduced signal is made constant and the input signal amplitude adaptation circuit portion described in FIG. 6 is not required.

Figure 11:
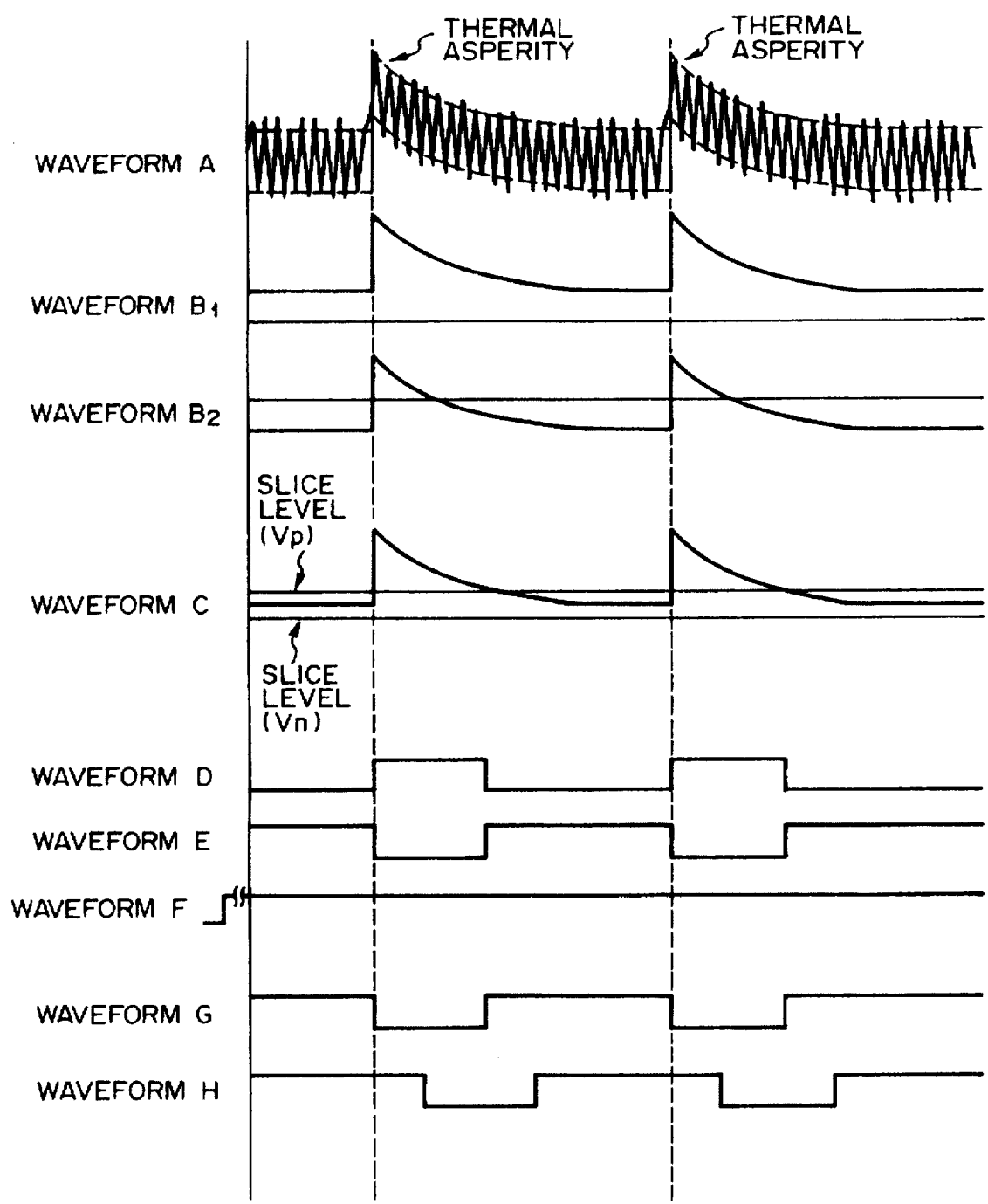
FIG. 11 is a diagram showing waveforms of various portions of the TA detection circuit.

The TA detection circuit 51 is now described with reference to FIGS. 9 and 11. A differential reproduced signal containing the thermal asperity is inputted from the reproduction amplification circuit 29 to the input terminal 53. One of the input signals is supplied to the TA detection control circuit 38 and only a half of the other input signal indicated by a waveform A is supplied to the upper envelope detection circuit 39 and the lower envelope detection circuit 40. An output waveform B1 of the upper envelope detection circuit 39 and an output waveform B2 of the lower envelope detection circuit 40 are supplied to the averaging circuit 41 to obtain an average momentary voltage. The relation and operation of the upper envelope detection circuit 39, the lower envelope detection circuit 40, the TA detection control circuit 38 and the averaging circuit 41 are substantially the same as those described in FIGS. 1 and 6.

A output waveform C of the averaging circuit is supplied to comparators 56 and 57. The comparator 56 compares a slice level (Vp) inputted from a slice level 54 with the waveform C and when a level of the waveform C is higher than the slice level (Vp), the comparator 56 produces a high level logic as a waveform D. That is, while the thermal asperity is produced, the comparator produces the high level signal. The slice level (Vp) is set so that the comparator produces the high level signal during only the thermal asperity portion corresponding to an amplitude of the portion where the AGC 34 detects the amplitude in error and the gain of the AGC is changed adversely. On the other hand, the comparator 57 compares a slice level (Vn) inputted from a slice level 55 with the waveform C and when the level of the waveform C is higher than the slice level (Vn)., the comparator 57 produces a high level logic as a waveform F. The slice level (Vn) is set to be a lower level having a difference exceeding an amplitude of noise with respect to a level of the waveform C in the case where the thermal asperity does not occur.

There is a case where a waveform having the opposite polarity to that of the waveform A is inputted to the envelope detection circuits 39 and 40 depending on connection thereof, while the manner of setting the slice level (Vp) and the slice level (Vn) may be reversed in this case. That is, the setting manner of the slice level which is not depending on the polarity of the input waveform is as follows. The slice level (Vp) is set to a level which is higher than the reference level of the waveform C by a noise amplitude and is lower than a level capable of detecting the thermal asperity portion which influences the AGC. Further, the slice level (Vn) is set to a level which is lower than the reference level of the waveform C by the noise amplitude and is higher than the level capable of detecting the thermal asperity portion which influences the AGC.

A level of a waveform D is high in the thermal asperity portion and accordingly the level is inverted to a low level by an inverter (INV) 58 as shown in a waveform E. The waveforms E and F are supplied to an AND circuit 59 to produce a waveform G having a low level logic while the thermal asperity is produced. The control output of the AND circuit is supplied to the AGC 34. In the AGC 34, the amplitude detection circuit is fixed when a low level signal is supplied thereto and accordingly the AGC 34 becomes an amplifier circuit having a fixed gain. Further, the waveform G is supplied to a delay circuit 60 and its control output waveform H is supplied to the VFO 52. In the VFO 52, the phase comparison circuit is fixed upon a low level not to vary the oscillation frequency. A set value of a delay time of the delay circuit 60 is a transmission time from the input of the AGC 34 to the input of the VFO 52.

Figure 10:
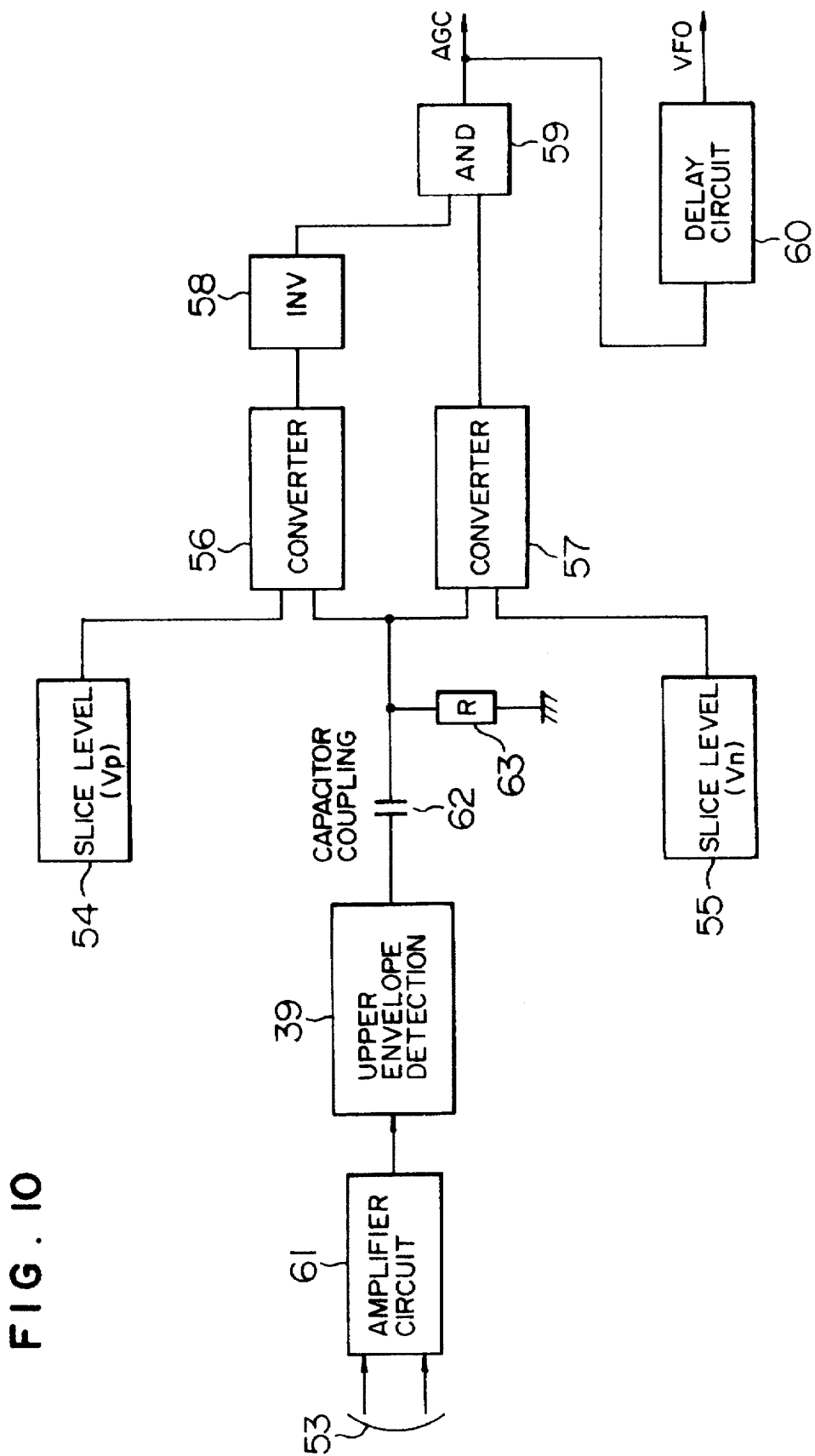
FIG. 10 is a schematic diagram illustrating a second embodiment of a TA detection circuit.

Another embodiment of the TA detection circuit 51 is now described with reference to FIG. 10. A signal inputted from the reproduction amplifier circuit 29 to an input terminal 53 is supplied through an amplifier circuit 61 to the upper envelope detection circuit 39. At this time, when the thermal asperity occurs, a positive voltage signal side is inputted to the upper envelope detection circuit 39, so that the upper envelope waveform at this time is reproduced.

The output of the upper envelope detection circuit 39 is connected through a capacitor 62 to the comparators 56 and 57. An output side of the capacitor is connected to the ground through a resistor 63 in order to apply a DC bias so that a reference level at the output side of the condenser becomes the ground level. The circuit subsequent to the comparators is the same as that of FIG. 9 and is accordingly omitted.

Figure 9:
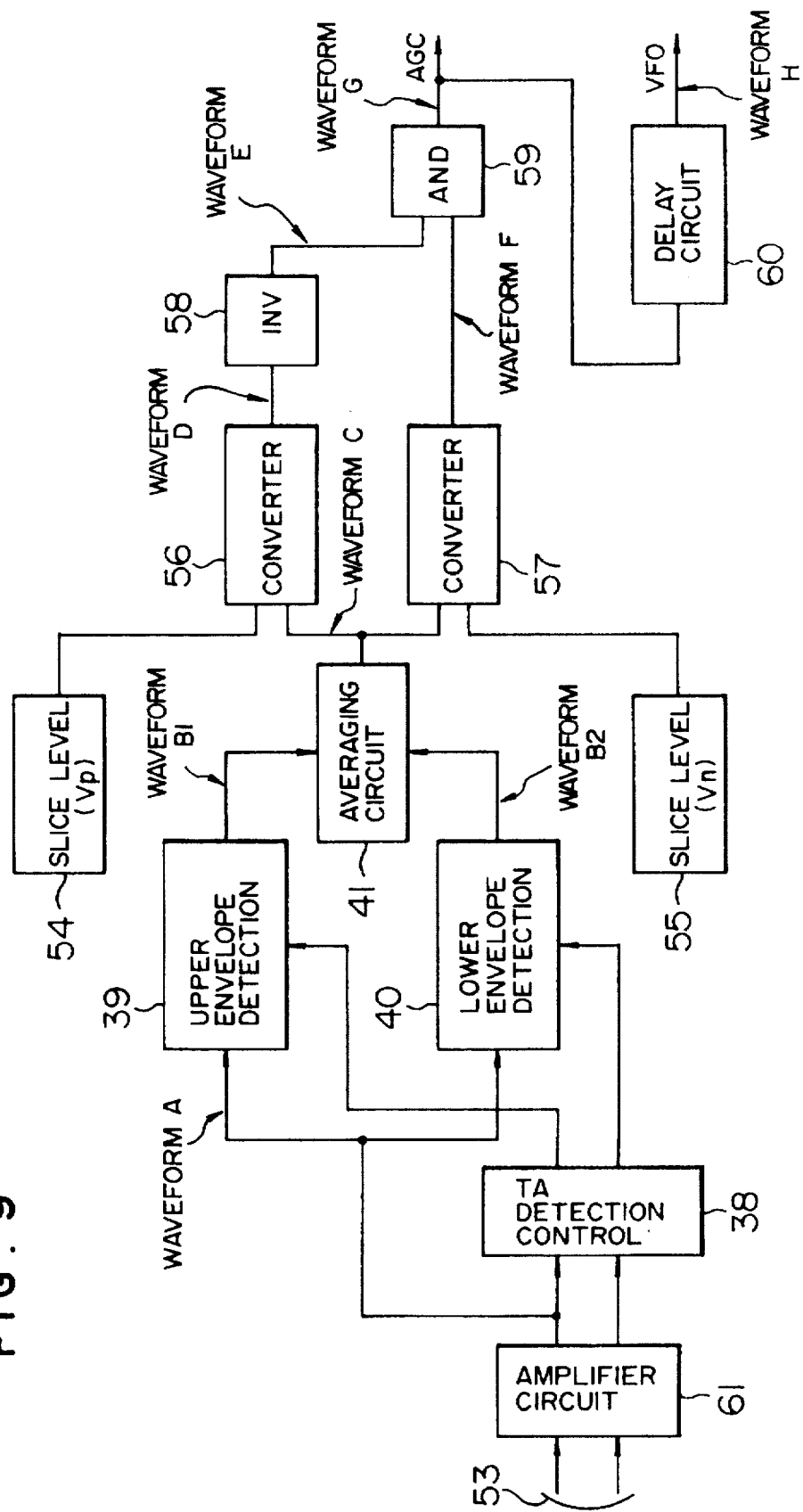
FIG. 9 is a schematic diagram illustrating a first embodiment of a TA detection circuit.

The features and effects of the embodiment have a simple circuit configuration since the TA detection control circuit and the lower envelope detection circuit shown in FIG. 9 are not required. On the other hand, if the modulation noise and the magnitude of the thermal asperity are the same degree, an error corresponding to the amplitude variation of the modulation noise occurs in the AGC 34.

According to the present invention, the provision of the forced charge and discharge circuit can improve the follow-up characteristic to a close state to the rising of the thermal asperity.

Further, by inserting the TA processing circuit before the AGC, the reproduced signal with the thermal asperity being removed can be inputted to the discrimination circuit and the reproduction circuit can be configured by a new addition without modification of the conventional discrimination circuit.

Furthermore, in the configuration in which the TA processing circuit is inserted to the output side of the AGC, since an amplitude of the reproduced signal inputted to the TA processing circuit is fixed, the configuration of the TA processing circuit can be simplified. In addition, when the thermal asperity occurs, the AGC and the VFO control to maintain the fixed state by means of the TA detection circuit, while since the configuration of the TA detection circuit is also simplified, improvement having a relatively small scale can be attained.

What is claimed is:

1. A magnetic recording and reproducing apparatus which reproduces information recorded in a magnetic recording medium in a form of magnetization transition by a magnetic reproducing head using a magneto-resistive element and detects variation of a resistance of the magneto-resistive element to produce a reproduced signal, comprising:

a processing circuit provided at an output side of an Automatic Gain Controlled Amplifier (AGC) for Compensating for a phenomenon that an amplitude of the reproduced signal is little varied and a level of the reproduced signal is varied; and a circuit system in which an output of a reproduction amplifier circuit is branched and which detects a phenomenon that an amplitude of the reproduced signal is little varied and a level of the reproduced signal is varied and produces an output to an AGC and a Variable Frequency Oscillator (VFO), said magnetic recording and reproducing apparatus further comprising a circuit system for detecting a phenomenon that an amplitude of the reproduced signal is little varied and a level of the reproduced signal is varied and including first means for reproducing an upper envelope of a signal, second means for reproducing a lower envelope of the signal, third means for controlling said first and second means to follow sudden variation of the envelope, fourth means for reproducing an amount of variation of the level of the reproduced signal from said first and second means, fifth means for producing a voltage higher than a DC voltage of said fourth means, sixth means supplied with outputs of said fifth and fourth means for comparing levels thereof to produce digital data, seventh means for producing a voltage lower than the DC voltage of said fourth means, eighth means supplied with branched outputs of said seventh and fourth means for comparing levels thereof to produce digital data, ninth means for inverting a logic of the digital data produced by said sixth means, tenth means for producing an AND signal of outputs of said ninth and eighth means, and eleventh means for delaying an output of said tenth means, the output of said tenth means being supplied to said AGC circuit, an output of said eleventh means being supplied to said VFO circuit.

2. A magnetic recording and reproducing apparatus which reproduces information recorded in a magnetic recording medium in a form of magnetization transition by a magnetic reproducing head using magneto-resistive element and detects variation of a resistance of the magneto-resistive element to produce a reproduced signal, comprising:

a processing circuit provided at an output side of an Automatic Gain Controlled Amplifier (AGC) for compensating for a phenomenon that an amplitude of the reproduce signal is little varied and a level of the reproduced signal is varied; and a circuit system in which an output of a reproduction amplifier circuit is branched and which detects a phenomenon that an amplitude reproduced signal is little varied and a level of the reproduced signal is varied and produces an output to an AGC and Variable Frequency Oscillator (VFO), said magnetic recording and reproducing apparatus further comprising a circuit system for detecting a phenomenon that an amplitude of the reproduced signal is little varied and a level of the reproduced signal is varied and including first means for reproducing an upper envelope of a signal, second means for AC coupling an output of said first means by means of a capacitor, third means for producing a voltage higher than a DC voltage of said second means, fourth means supplied with outputs of said third means and said second means for comparing levels thereof to produce digital data, fifth means for producing a voltage lower than the DC voltage of said second means, sixth means supplied with branched outputs of said fifth means and said second means for comparing levels thereof to produce digital data, seventh means for inverting a logic of the digital data produced by said fourth means, eighth means for producing an AND signal of outputs of said seventh and sixth means, and ninth means for delaying an output of said eighth means, the output of said eighth means being supplied to said AGC circuit, an output of said ninth means being supplied to said VFO circuit.

3. A magnetic recording and reproducing apparatus comprising a processing circuit for compensating for a phenomenon that an amplitude of a reproduced signal is little varied and a level of the reproduced signal is varied and including first means supplied with a signal in which an amplitude of a reproduced signal thereof is little varied and a level of the reproduced signal thereof is varied for reproducing an upper envelope of said signal, second means for reproducing a lower envelope of said signal, third means for controlling said first and second means to follow sudden variation of the envelope, fourth means for reproducing an amount of variation of the level of the reproduced signal from said first and second means, fifth means for passing a signal having a sudden level variation and a large amount of variation of an output signal of said fourth means and removing other signals, sixth means for delaying an input signal, and seventh means for compensating for level variation of the reproduced signal by subtracting or adding an output of said fifth means from or to an output of said sixth means.

4. A magnetic recording and reproducing apparatus according to claim 3, wherein a sum of times required for said first or second means, said fourth means and said fifth means is set as a delay time of said sixth means.

5. A magnetic recording and reproducing apparatus which reproduces information recorded in a magnetic recording medium in a form of magnetization transition by a magnetic reproducing head using a magneto-resistive element and detects variation of a resistance of the magneto-resistive element to produce a reproduced signal, a Variable Frequency Oscillator (VFO), a reduction amplifier circuit having an output and an Automatic Controlled Amplifier AGC having an input coupled to the output of said reproduction amplifier circuit comprising:

a thermal asperity processing circuit coupled to an output side of the AGC and compensating for a phenomemon that an amplitude of the reproduced signal is little varied and a level of the reproduced signal is varied; and a thermal asperity detection circuit system coupled to the output of the reproduction amplifier circuit and which detects a phenomenon that an amplitude of the reproduced signal is little varied and a level of the reproduced signal is varied, and then produces an output to the AGC and the VFO, wherein said thermal asperity detection circuit system includes:

an upper envelope detection circuit having an input receiving an input signal;

a lower envelope detection circuit having an input receiving said input signal;

a controller coupled to the output of said upper envelope detection circuit and to the output of said lower envelope detection circuit, said controller follows sudden variations of the envelope of the input signal;

an averaging circuit coupled to the output of said upper envelope detection circuit and said lower envelope detection circuit;

a first comparator coupled to the output of said averaging circuit and which compares the output signal of said averaging circuit to a voltage higher than a DC voltage of the input signal;

a second comparator coupled to the output of said averaging circuit and which compares the output signal of said averaging circuit to a voltage lower than a DC voltage of the input signal;

an inverter coupled to the output of said first comparator;

an AND gate coupled to the output of said second comparator and the output of said inverter, and having an output coupled to the input of said AGC; and a delay circuit coupled to the output of said AND gate, said delay circuit having an output coupled to the input of said VFO.

6. A magnetic recording and reproducing apparatus which reproduces information recorded in a magnetic recording medium in a form of magnetization transition by a magnetic reproducing head using a magneto-resistive element and detects variation of a resistance of the magneto-resistive element to produce a reproduced signal, including a Variable Frequency Oscillator (VFO), a reduction amplifier circuit having an output and an Automatic Gain Controlled Amplifier (AGC) having an input coupled to the output of said reproduction amplifier circuit comprising:

- a thermal asperity processing circuit coupled to an output side of the AGC and compensating for a phenomenon that an amplitude of the reproduced signal is little varied and a level of the reproduced signal is varied; and
- a thermal asperity detection circuit system coupled to the output of the reproduction amplifier circuit and which detects a phenomenon that an amplitude of the reproduced signal is little varied and a level of the reproduced signal is varied, and then produces an output to the AGC and the VFO, wherein said thermal asperity detection circuit system includes:
  - an upper envelope detection circuit having an input receiving an input signal;
  - a capacitor coupled to the output of said upper envelope detection circuit;
  - a first comparator coupled to the output of said capacitor and which compares the output of said capacitor to a voltage higher than a DC voltage of the input signal;
  - a second comparator couple to the output of said capacitor and which compares the output of said capacitor to a voltage lower than a DC voltage of the input signal;
  - an inverter coupled to the output of said first comparator;
  - an AND gate coupled to the output of said second comparator and the output of said inverter, and having an output coupled to the input of said AGC; and
  - a delay circuit coupled to the output of said AND gate, said delay circuit having an output coupled to the input of said VFO.

* * * * *

UNITED STATES PATENT AND TRADEMARK OFFICE
CERTIFICATE OF CORRECTION

PATENT NO. : 5,715,110

DATED : 3 February 1998

INVENTOR(S) : Nobumasa NISHIYAMA et al.

It is certified that error appears in the above-identified patent and that said Letters Patent is hereby corrected as shown below:

| Column | Line | |
|--------|------|---|
| 5 | 61 | Change "filter; and" to --filter.--. |
| 7 | 27 | Before "amplitude" delete "the". |
| 16 | 55 | Change "Com-" to -- com- --. |
| 17 | 27 | After "using" insert --a--. |
| 17 | 37 | After "amplitude" insert --of the--. |
| 18 | 23 | After "signal," insert --including a--. |

Signed and Sealed this

Eighth Day of September, 1998

Attest:

BRUCE LEHMAN

Attesting Officer  Commissioner of Patents and Trademarks